United States Patent
White

(10) Patent No.: US 6,959,283 B1
(45) Date of Patent: Oct. 25, 2005

(54) AUTOMATED CAFETERIA

(75) Inventor: Daniel F. White, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/538,466

(22) Filed: Mar. 29, 2000

(51) Int. Cl.$^7$ ............................................... G06F 17/60
(52) U.S. Cl. .......................... 705/26; 705/27; 235/383; 235/384
(58) Field of Search ............................... 705/7, 15, 26, 705/2, 22, 27; 235/383, 380, 384; 186/39; 320/109; 702/84; 345/204; 70/57.1; 340/571, 340/5.9; 707/104.1

(56) References Cited

U.S. PATENT DOCUMENTS

| | | | |
|---|---|---|---|
| 4,396,985 A | 8/1983 | Ohara | 364/405 |
| 4,415,065 A | 11/1983 | Sandstedt | 186/39 |
| 4,547,851 A | 10/1985 | Kurland | 364/401 |
| 4,569,421 A | 2/1986 | Sandstedt | 186/39 |
| 4,797,818 A | 1/1989 | Cotter | 364/401 |
| 4,882,475 A * | 11/1989 | Miller et al. | 235/383 |
| 5,003,472 A | 3/1991 | Perrill et al. | 364/401 |
| 5,128,862 A | 7/1992 | Mueller | 364/405 |
| 5,235,509 A | 8/1993 | Mueller et al. | 364/405 |
| 5,317,304 A * | 5/1994 | Choi | 340/571 |
| RE34,872 E | 3/1995 | Lucero | 235/381 |
| 5,475,377 A * | 12/1995 | Lee | 340/5.9 |
| 5,510,979 A | 4/1996 | Moderi et al. | 364/405 |
| 5,566,327 A * | 10/1996 | Sehr | 707/104.1 |
| 5,802,890 A * | 9/1998 | Espada-Velasco | 70/57.1 |
| 5,822,544 A * | 10/1998 | Chaco et al. | 705/2 |
| 5,838,798 A | 11/1998 | Stevens | 380/49 |
| 5,845,263 A * | 12/1998 | Camaisa et al. | 705/15 |
| 5,890,136 A * | 3/1999 | Kipp | 705/22 |
| 5,991,739 A * | 11/1999 | Cupps et al. | 705/26 |
| 6,085,976 A * | 7/2000 | Sehr | 235/384 |
| 6,102,162 A * | 8/2000 | Teicher | 186/39 |
| 6,129,274 A * | 10/2000 | Suzuki | 235/381 |
| 6,154,006 A * | 11/2000 | Hatanaka et al. | 320/109 |
| 6,236,974 B1 * | 5/2001 | Kolawa et al. | 705/7 |
| 6,381,582 B1 * | 4/2002 | Walker et al. | 705/26 |
| 6,409,081 B1 * | 6/2002 | Nugent, Jr. | 235/383 |
| 6,484,113 B1 * | 11/2002 | Tsai et al. | 702/84 |
| 6,598,790 B1 * | 7/2003 | Horst | 235/383 |
| 2001/0007450 A1 * | 7/2001 | Begum | 345/204 |
| 2002/0007321 A1 * | 1/2002 | Burton | 705/26 |

FOREIGN PATENT DOCUMENTS

WO    WO 98/48563    * 10/1998    .......... H04M 11/00

OTHER PUBLICATIONS

Press release dated Apr. 8, 1998 and copies of Web pages (total 7 pages) on Food.com web site extracted from http://proquest.umi.com and www.food.com web sites on Aug. 1, 2002.*

Press release dated Jul. 10, 1996, Mar. 26, 1997 and Mar. 15, 1998 and copies of web pages of Waiter.com web site from http:// proquest.umi.com and www.Waiter.com websites on Aug. 1, 2002.*

Tice, Carol, " Web Ordering May Alter Role of Distributors", National Home Center News, v 24, n 10, p23-25, Jun. 22, 1998 extracted on Internet on Aug. 1, 2002.*

* cited by examiner

*Primary Examiner*—Yogesh C. Garg
(74) *Attorney, Agent, or Firm*—Gregory A. Welte; Maginot, Moore & Beck LLP

(57) ABSTRACT

An automated cafeteria. Customers place orders via computers, over the Internet. Their orders are prepared by the cafeteria, and placed into a delivery bay. Each customer retrieves his own order from the bay, and carries it to a payment station. Security measures discourage theft.

12 Claims, 4 Drawing Sheets

```
┌─23
▼
┌─────────────────────────────────────────────────────┐
│ PHIL JACKSON, ACCOUNT NUMBER 47                     │
├──────────────────────────┬──────────────────────────┤
│ YOUR ORDER IS            │ THIS WILL BE READY    27 │
│                          │ AFTER 11:00           ── │
│ SANDWICH C        24     │                          │
│                   ──     │                          │
│ WITH EXTRA F             │ DO YOU WISH TO SPECIFY   │
│                          │ A PARTICULAR TIME FOR    │
│ AND LARGE DRINK A        │ PICKUP? IF SO, ENTER     │
│                          │ THAT TIME:_____          │
├──────────────────────────┴──────────────────────────┤
│ AN ORDER NUMBER IS STORED IN YOUR TRANSCEIVER       │
│ IT IS 101               BRING IT FOR PICK-UP    30  │
│                                                 ──  │
└─────────────────────────────────────────────────────┘
```

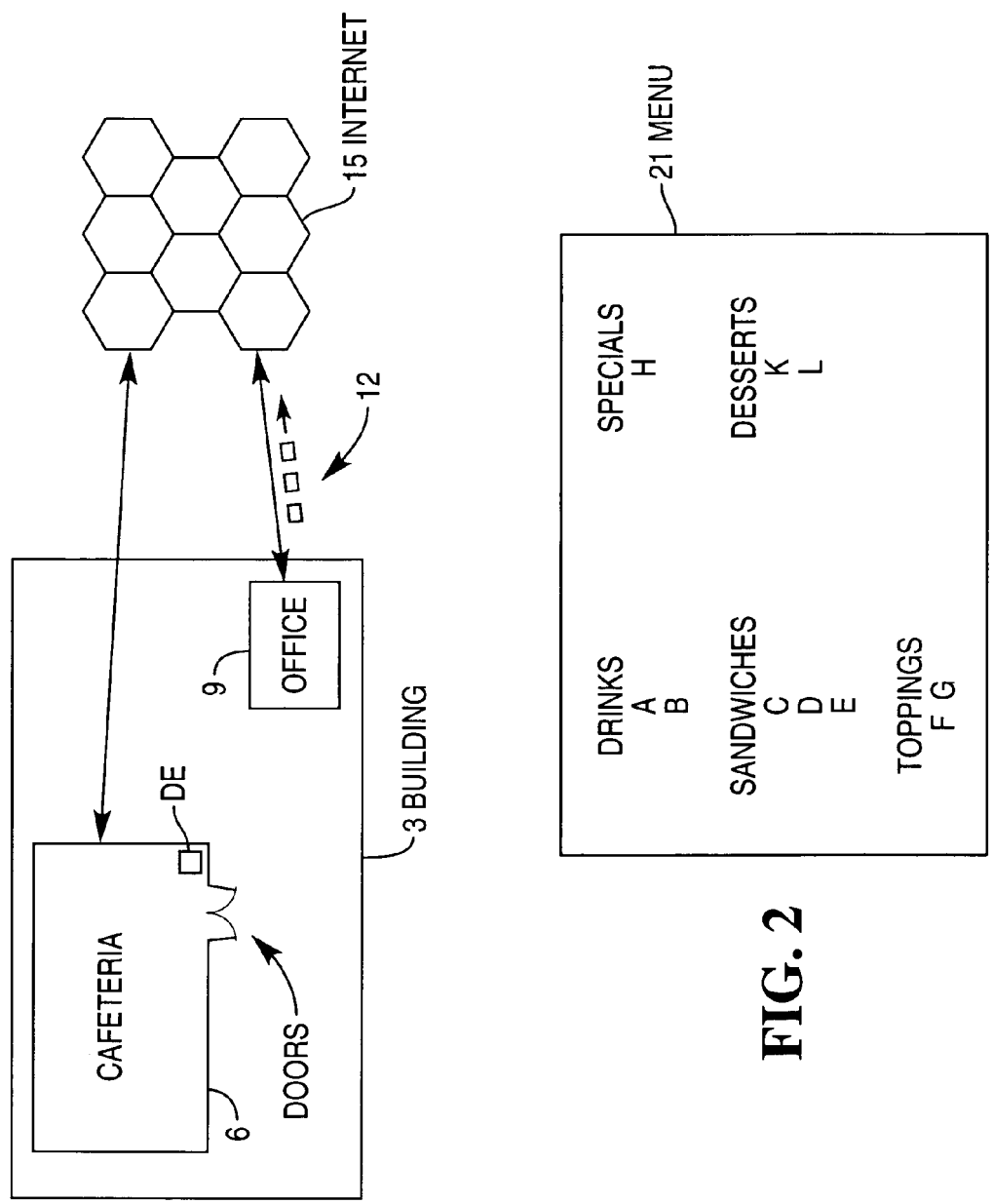

FIG. 3

| PHIL JACKSON, ACCOUNT NUMBER 47 | 23 |
|---|---|
| YOUR ORDER IS<br><br>SANDWICH C  24<br>WITH EXTRA F<br><br>AND LARGE DRINK A | THIS WILL BE READY  27<br>AFTER 11:00<br><br>DO YOU WISH TO SPECIFY<br>A PARTICULAR TIME FOR<br>PICKUP? IF SO, ENTER<br>THAT TIME:_____ |
| AN ORDER NUMBER IS STORED IN YOUR TRANSCEIVER<br>IT IS 101                          BRING IT FOR PICK-UP   30 | |

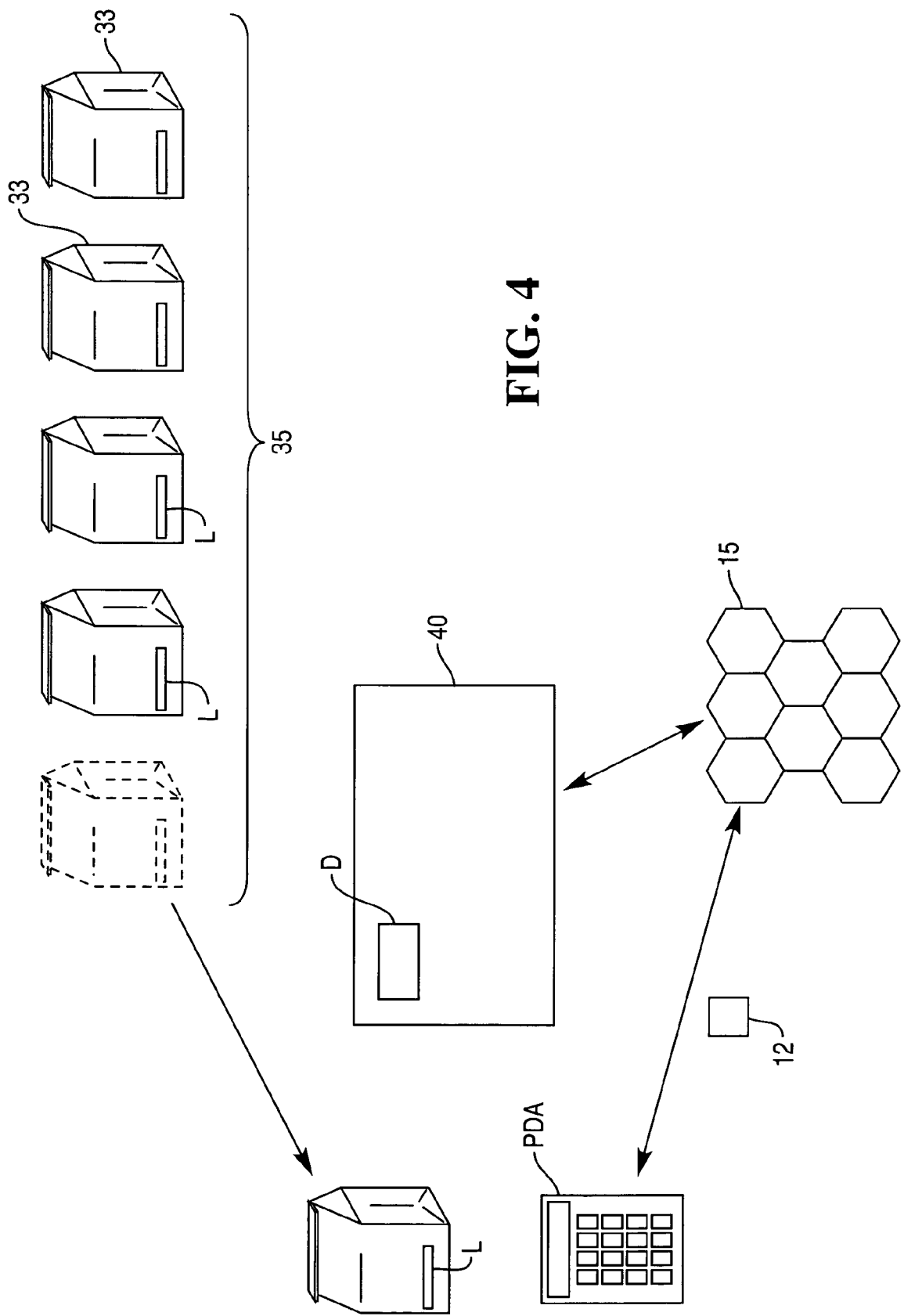

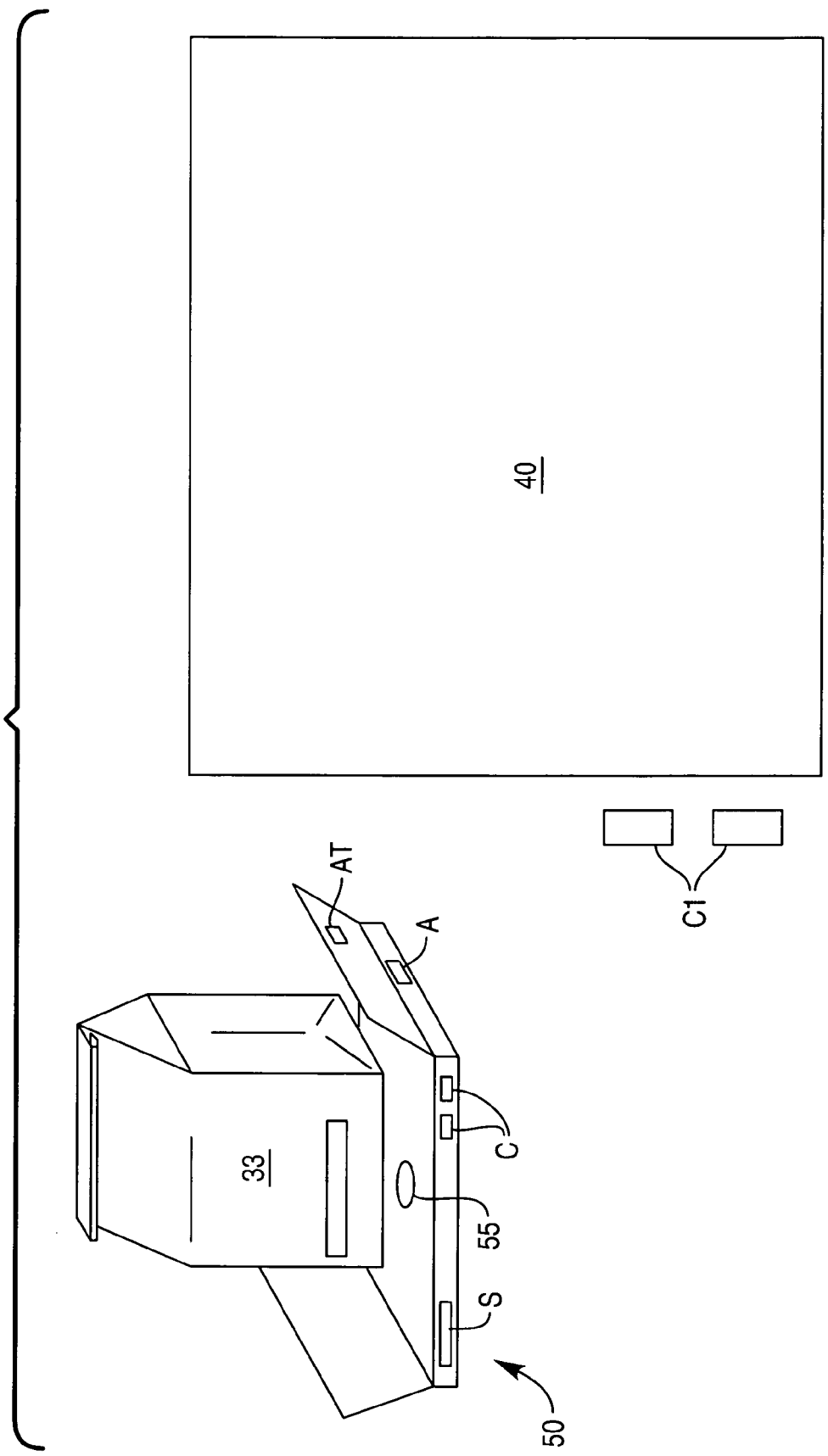

AUTOMATED CAFETERIA

The invention concerns an automation system for a cafeteria, in which the number of people involved in order-taking and money-handling transactions is reduced.

BACKGROUND OF THE INVENTION

Examination of many cafeterias and fast food restaurants indicates that customers tend to queue up at two bottlenecks: (1) a station where special orders are placed, and (2) a cashier's station, where payment is made.

This queueing is undesirable: for (1) a given number of customers and (2) a given amount of food sold, the amount of work done by the restaurant personnel does not change appreciably whether a queue is present or absent. Thus, it can be concluded that the queues represent a waste of the customers' time.

OBJECTS OF THE INVENTION

An object of the invention is to provide an improved cafeteria.

A further object of the invention is to provide a restaurant which handles electronic ordering and automated delivery.

SUMMARY OF THE INVENTION

In one form of the invention, orders for take-out food items are placed over the Internet. A restaurant receives the orders, and prepares the appropriate foods. The prepared orders are placed in a delivery bay. Customers arrive at the restaurant, retrieve their orders, and pay for them, without dealing with personnel of the restaurant.

BRIEF DESCRIPTION OF THE DRAWINGS

FIG. 1 illustrates a building.
FIG. 2 illustrates a web page.
FIG. 3 illustrates a message which the web page of FIG. 2 delivers to a person.
FIG. 4 illustrates one form of the invention.
FIG. 5 illustrates security baskets utilized by the invention.

DETAILED DESCRIPTION OF THE INVENTION

FIG. 1 illustrates an office building 3, which contains a cafeteria 6, or other fast-food restaurant, and an office 9. A person within the office 9 who desires to order a meal transmits a message to the cafeteria, placing an order.

The message can take the form of a sequence of commands 12, which are delivered to a public-access network such as the Internet, indicated as network 15. Those commands are issued by a micro-computer (not shown) controlled by the person, or by a smaller, portable, computer, such as a Personal Digital Assistant, PDA. Those commands locate a web page maintained by the cafeteria.

FIG. 2 illustrates a menu 21 presented by the web page of the cafeteria 6. The menu contains items which the person can order. A significant feature of the ordering, process is the absence of ambiguity. That is, in one embodiment, the customer is allowed to submit only selections made from a predetermined list generated by the cafeteria. No other submissions are allowed.

For example, in FIG. 2, the customer may select sandwich C with topping F and drink A. However, the customer may not add a statement to the order, such as "Drink A should be shaken, not stirred." With this arrangement, there is no possibility for ambiguity: an individual item, presented on the menu, is either selected or not.

When the order is placed, the cafeteria's web site confirms the order by replacing the menu 21 in FIG. 2 with a screen of the type shown in FIG. 3. That screen, in sub-window 23, identifies the person ordering, as by name or an account number, or both. This identification is done for billing purposes.

As will be explained below, all customers of the cafeteria are members of a closed society, such as employees of a common company, or guests of those employees. In such a case, customary procedures used to enforce honesty can be relaxed to an extent, thereby providing greater convenience to all parties.

The screen in FIG. 3 also identifies the items ordered, as indicated in sub-window 24. Sub-window 27 states a projected time when the order will be ready, so that the person can arrange for arrival at the cafeteria at that time. That sub-window also allows the person to specify another time, if desired. In such a case, the cafeteria arranges its preparation of the order to coincide with that specified time of arrival.

In sub-window 30, the cafeteria assigns an order number, informs the person of that number, and advises the person to bring that number when the order is to be picked up. In addition, computer used by the person to place the order stores that order number.

Once the order is placed, the food items ordered are prepared by the cafeteria. The order, together with others, may be displayed on a common display screen which is viewed by the chefs, who proceed to fill the orders.

As stated above, an order number is transmitted to the customer's computer. This number will associate the person with the order, when the person arrives at the cafeteria, and so the person must bring this number to the cafeteria. Several approaches can be taken by the person in recording the number.

In one approach, the person simply remembers the number.

In another approach, a record of the items ordered is printed by the person's computer onto ordinary paper, together with the order number. The order number may also be printed in bar-code format, for later machine-recognition. Other machine-readable types of symbology can also be used, such as the alpha-numeric characters used on bank checks, or other specialized typefaces designed for accuracy in machine-reading operations.

In another approach, the computer used by the person identifies itself to the web site as being of the portable type, such as a PDA. As stated above, the web site transmits the order number to the computer, which stores it. The person carries the PDA to the cafeteria.

In another approach, the web site transmits the order number to the person's computer, and the computer loads that number onto a stored-value card, using a card reader. Stored-value cards resemble ordinary credit cards, and contain a magnetic stripe, or other data-storage medium.

Such cards are commonly issued by libraries, for use in copy machines. A party purchases a stored-value card from a vending machine, and the card is issued with a specific stored value, such as ten dollars.

Under the invention, that type of card is used for an additional function, namely, to receive, and store, the order number from the person's computer. Thus, in this approach, the value-added card contains two fields: a stored cash amount, and the order number.

In a related approach, the value-added card may be assigned a single number when it is issued. This card thus contains two fields: (1) a stored cash amount, and (2) a permanent identification (ID) number. That permanent ID number may also be printed on the card's face, in human-readable form.

When a person places an order, the person transmits the card's ID number, either by swiping the card through a reader at the person's computer, or by reading the printed ID number from the card, and transmitting it as one of the messages 12 in FIG. 1. As will be seen later, the ID number is used to locate the order at the cafeteria, rather than the person's identification. In effect, the person selects the person's own order number. In another related approach, the association of the ID number of the stored-value card with the order placed by the person is simplified. As stated above, the person places the order to the cafeteria's web page, using a type of computer. Prior to that, when the person purchases the stored-value card at a vending machine, the vending machine stores the ID number of the card sold at a web site maintained by the owner of the vending machine. Later, the person purchasing the card contacts that web site, and obtains the ID number of the card. That ID number is used in later purchases with the cafeteria.

Irrespective of the manner in which the ID number of the stored-value card is loaded into the person's computer, that number is used as the order number in sub-window 30 in FIG. 3.

In another approach, the order number is eliminated entirely, and the person's name is used to identify the order. In many cases, this approach is preferred for its simplicity.

Therefore, irrespective of how the person's order is identified, an identifying symbol, word, or phrase, is attached to it by the cafeteria, so that the person can be matched with the order when the person arrives at the cafeteria.

At an appropriate time, the person arrives at the cafeteria 6. As shown schematically in FIG. 4, several prepared orders 33 are held in a delivery bay, or rack, 35 located in the cafeteria. Now, two events must occur. One is that the person must locate the order. In general, that requires the steps of (1) matching each order 33 within the bay 35 with (2) a respective person within a group of persons (not shown).

For example, if ten persons place ten orders, and if the ten orders stand in the bay 35, the first person will, on average search through five orders before finding it. The next person will, on average, search through 9/2 orders. The third, on average, will search through 4 orders. Each person, on average, will examine one half of the orders standing in the bay 35, with the exception of the last person, who will, of course, see only a single order.

The second event is that payment for the orders must be made.

Preferably, these two events are executed by the person placing the order, and without assistance of any employees of the cafeteria.

As to the first event, each order is labeled with a label L bearing the order number, or equivalent, which was previously delivered to the person. The person visually searches for that label, and, when found, retrieves the package bearing it.

Restated, when the person placed the order by computer, an identifying symbol was transmitted to the person. In addition, a label L was generated bearing that symbol, and is attached to the order when complete.

Next, the person carries the selected order to a check-out station, which is preferably automated, and not staffed by any other persons. Block 40 in FIG. 4 represents such a check-out station.

The check-out station 40 reads the label L on the package. To facilitate this reading, the label may contain two types of symbology, one which is readable by humans, and one which is readable by machine, such as a bar code.

Next, the person presents the order number to the check out station 40. The check-out station 40 ascertains whether the label L corresponds to the order number. That is, the check-out station verifies that the person has selected the correct order 33. If not, a warning is given to the person, such as a pre-recorded audible message, or a printed message on a computer display D. The person then corrects the mistake, by locating an order 33 containing the correct label.

Next, the person makes payment. Several approaches are possible. Under one approach, the "honor system" prevails. Every person placing orders is known to the cafeteria, and the charge for the order is placed on the person's account. In this case, the two events described above reduce to the following: (1) deliver the package, and (2) assure that the package is actually delivered to the proper person. Several approaches are possible to attain these assurances.

In one approach, all persons prove their identities to the check-out station 40. Identity-proving to a robotic station is known in the art. Identification processes at Automated Teller Machines provide examples.

When the check-out station reads the label L, it then obtains sufficient information to determine whether the package bearing label L is now in possession of the appropriate person. If so, that person's account is billed the appropriate amount. If not, as when the person accidentally has retrieved the wrong package, the check-out station detects this mistake, and sounds a warning.

In another approach, the person presents the order number which was transmitted to the person's computer earlier. To make payment, the person presents an added-value card, as described earlier. The check-out station deducts the appropriate amount from the card, and returns it to the person.

A smart card, or credit card, can also be used for these purposes. However, it may be preferred that such cards which involve credit card billing networks be avoided, because of cost. That is, the smart card is preferably the functional equivalent of a stored-value card. It is issued locally, and it is not used to make purchases which are recorded in a system which issued monthly billing statements to the owners of the card.

Many smart cards can be used as a stored value cards, as well as the usual smart card function. In the latter case, billing through a billing network is involved, but, in the former case, such billing is not, and the network charges are avoided. Consequently, use of smart cards as stored value cards is desirable.

In a third approach, the person utilizes the PDA, which placed the order originally, to achieve identification and payment. As shown in FIG. 4, the PDA transmits a message to the Internet, indicated by arrow A. That message contains the order number, or equivalent, which proves that the PDA placed the order. The check-out station reads the label L on the package, thereby determining that the order was, in fact, delivered to the proper party. Then, the station bills the account of that party for the order.

Alternately, the PDA can communicate directly with the check out station 40, without the intermediary of the Internet 15.

Recapitulation

A message is delivered to a cafeteria. That message contains an order for food items. The cafeteria prepares the order, and places prepared orders in a bay for retrieval by persons placing the orders.

Each person retrieves his own order from the bay, and submits payment in an appropriate manner. An automated check out station verifies that each person selects the correct order, and issues a warning if a mistake occurs. The retrieval and payment steps are undertaken by the person alone, with no interaction between the person and a representative of the cafeteria.

In a preferred, simplified, mode of operation, a person's name is affixed to the order. A machine-readable code is also affixed to the order, indicating the cost of the order. Customers are entrusted to select their own orders from the bay. If a customer picks up the wrong order, nevertheless, the customer pays the price stated on the order. Thus, from the cafeteria's perspective, no dishonestly is expected. From the customer's perspective, an order picked up by another simply represents a loss of time.

Additional Considerations

1. An overall supervisor of the cafeteria may be present to monitor the process, to discourage dishonesty.

2. In one embodiment, orders are only accepted from a specific group of people, such as the employees of a company. When an order is placed, the cafeteria inquires whether the person placing the order is contained on a predetermined list. If not, the order is either rejected, or the person is informed that payment must be made in cash.

3. A standard check out station is also provided, for persons who do not wish to deal with the automated station 40 in FIG. 4, or for persons having special needs.

4. A primary concern of the cafeteria is that orders will be retrieved by parties, yet without payment. However, the fact that persons placing the orders are members of a closed society should act as a deterrent to dishonest behavior.

One exception would be the situation wherein a non-member of the closed society retrieves an order 33 from the bay 35 in FIG. 4. That person may attempt to steal an order placed by someone else. To reduce this, the apparatus of FIG. 5 may be implemented.

Each order 33 is placed in a basket 50. Each basket 50 contains a sensor 55, which detects when the order 33 is removed. When removal occurs, an alarm circuit A sounds an alarm. However, the sensor 55 is de-activated by the check-out station 40 in FIG. 5 at the time of payment. For example, the basket may contain two electrical contacts C. Those are brought into contact with mating contacts C1 at the station 40. The station broadcasts a specific code to the basket, which alarm A within the basket recognizes, and de-activates the alarm. At that time, the order 33 is removed from the basket, and the basket is placed onto a storage stack.

Later, when the basket is used to carry a new order, a switch S is flipped, re-activating the alarm.

In another embodiment, the basket may take the form of a locked cage. The cage is only unlocked by the station 40, when payment is made. No one is allowed to remove a cage, or basket, from the cafeteria. To prevent this removal, each basket/cage is equipped with an anti-theft device AT, which is non-removable. A detector DE at the doors of the cafeteria in FIG. 1 detects the anti-theft device, and sounds an alarm.

Anti-theft devices are well known. They are used in libraries and department stores to detect the unauthorized removal of books and merchandise. One form of the device takes the form of a serpentine metallic foil. The foil acts as an antenna. The detector DE in FIG. 1 broadcasts a radio-frequency signal, to which the antenna/foil is sensitive. When the antenna/foil comes within range of the detector DE, the detector DE detects the absorption of energy by the antenna/foil, or the reflection of that energy.

5. The invention is not limited to cafeterias, but can be used in any system where (1) merchandise is retrievable by customers, analogous to orders 33 in FIG. 4, and (2) the customers pay for the merchandise without the assistance of another party.

6. It is understood that the bar codes on the labels L are not Uniform Product Codes, UPCs. Restated, the labels may contain bar codes. However, technically, a bar code is not a UPC, although UPCs utilize bar codes. The difference lies in the fact that UPCs are bar codes which are registered with a central agency. If the number coded into the UPC-bar code is read from the code, and presented to the agency, the agency can indicate (1) the person to whom the number is registered and (2) the product which the number identifies. In contrast, the meaning of a number represented by an ordinary bar code is controlled completely by the person generating the bar code. Of course, an ordinary bar code can, coincidentally or intentionally, represent the same number registered as a UPC.

Numerous substitutions and modifications can be undertaken without departing from the true spirit and scope of the invention. What is desired to be secured by Letters Patent is the invention as defined in the following claims.

What is claimed is:

1. An automated cafeteria system comprising:
   a cafeteria web site for presenting a menu over a public-access network and for assigning an order number to an order comprised of menu selections;
   a computer for viewing the menu presented by the cafeteria web site over the public-access network, for issuing an order message comprised of menu selections, and for receiving the assigned order number;
   a storage unit coupled to the computer for storing the assigned order number;
   a label generator for receiving the assigned order number from the cafeteria web site and for generating a label identifying the assigned order number for a corresponding prepared order, the label being associated with the corresponding prepared order; and
   an automated check-out station for retrieving the assigned order number from the storage unit and for verifying that the retrieved assigned order number corresponds to the assigned order number on the generated label for a prepared order presented to the automated checkout station so that the prepared order may be obtained at the automated check-out counter.

2. The system of claim 1 wherein the computer is a personal digital assistant (PDA) and the storage unit for the assigned order number is internal to the PDA.

3. The system of claim 1 further comprising:
   a card reader coupled to the computer; and
   the storage unit is a stored-value card so that an assigned order number received by the computer from the cafeteria web site may be stored by the card reader in the stored-value card and retrieved from the stored-value card by the automated check-out station.

4. The system of claim 3 wherein the automated check-out station deducts an amount corresponding to the prepared order that is verified as having an assigned order number on its generated label that corresponds to the assigned order number retrieved from the stored-value card.

5. The system of claim 1 further comprising:
   a basket for holding a prepared order, the basket having a sensor for detecting removal of a prepared order placed within the basket and generating an alarm in response to detection of such removal; and
   the automated check-out station for deactivating the basket sensor so that the prepared order may be removed from the basket without generating the alarm in response to the detection of such removal.

6. The system of claim 1, further comprising:
   a basket for holding a prepared order;
   an anti-theft device coupled to the basket; and
   a detector for detecting unauthorized removal of the basket from the automated check-out station site so that the anti-theft device has to be de-activated in order for the basket to be removed from the automated check-out station site without generating an alarm.

7. A method for automating cafeteria order correlation comprising:
   presenting a menu over a public-access network;
   selecting menu items from the presented menu over the public-access network to comprise an order;
   assigning an order number to the order comprised of the selected menu items;
   receiving the assigned order number over the public-access network;
   storing the assigned order number received over the public-access network in a storage unit;
   generating a label identifying the assigned order number for a corresponding prepared order comprised of selected menu items;
   retrieving the stored assigned order number from the storage unit at an automated check-out station site where prepared orders having generated labels are located; and
   verifying that the stored assigned order number retrieved at the site corresponds to the generated label identifying the assigned order number for a prepared order so the prepared order may be obtained contemporaneously with the assigned order number verification.

8. The method of claim 7 wherein the assigned order number storage comprises storing the assigned order number in a personal digital assistant (PDA); and the assigned order number verification further comprising:
   retrieving the assigned order number from the PDA and determining whether the retrieved assigned order number corresponds to the generated label identifying the assigned order number.

9. The method of claim 7, the storing of the assigned order number further comprising:
   storing the assigned order number received over the public-access network in a stored-value card so that the assigned order number may be retrieved from the stored-value card at the site where prepared orders having generated labels are located for verification.

10. The method of claim 7, the method further comprising:
    deducting an amount corresponding to the prepared order verified as having an assigned order number on its generated label that corresponds to the assigned order number retrieved from the stored-value card.

11. The method of claim 7 further comprising:
    detecting removal of a prepared order from a basket containing the prepared order before order identification verification occurs; and
    deactivating the removal detection so that the prepared order may be removed from the basket without detection.

12. The method of claim 7, the method further comprising:
    an anti-theft device to a basket containing a prepared order;
    detecting unauthorized removal of the basket containing the prepared order from the automated check-out station site; and
    deactivating the anti theft device in response to the verification that the stored assigned order number corresponds to the assigned order number for the prepared order in the basket.

* * * * *